United States Patent [19]

Ohm et al.

[11] Patent Number: 5,455,556
[45] Date of Patent: Oct. 3, 1995

[54] SINGLE STATION CURSOR DEVICE SUITABLE FOR KEYBOARDS

[75] Inventors: Patrick L. Ohm; Mark W. Fagan; Larry F. Norte; Charles L. Fauble, all of El Paso, Tex.

[73] Assignee: Key Tronic Corporation, Spokane, Wash.

[21] Appl. No.: 748,129

[22] Filed: Aug. 20, 1991

[51] Int. Cl.⁶ .................................................. H01C 10/10
[52] U.S. Cl. .............................. 338/114; 338/128; 338/47
[58] Field of Search ................................ 338/114, 47, 99, 338/128; 340/711, 365 A; 200/5 A; 73/862.04, 865.7

[56] References Cited

U.S. PATENT DOCUMENTS

| | | |
|---|---|---|
| 4,313,113 | 1/1982 | Thornburg . |
| 4,315,238 | 2/1982 | Eventoff ...................................... 338/99 |
| 4,322,983 | 4/1982 | Sado ........................................ 338/114 |
| 4,520,240 | 5/1985 | Swindler . |
| 4,680,577 | 7/1987 | Straayer et al. . |
| 4,775,765 | 10/1988 | Kimura et al. ........................ 338/99 X |
| 4,931,781 | 6/1990 | Miyakawa . |

*Primary Examiner*—Marvin M. Lateef
*Attorney, Agent, or Firm*—Wells, St. John, Roberts, Gregory & Matkin

[57] ABSTRACT

A cursor control device includes a single key cursor control which utilizes pressure sensitive resistors for controlling cursor movement. Pressure sensitive resistors are arrayed so as to provide an output corresponding to the magnitude and direction of an applied input pressure. Input pressure is transmitted to these resistors by a means for actuating these devices. The means for actuating can include a single key which incorporates functionality of both up, down, left and right cursor control keys and pointing devices to produce horizontal, vertical, diagonal and curvilinear cursor movement. Cursor control device offers mechanically simple, low cost construction, and can be incorporated onto many keyboard constructions. Cursor control device can be positioned on keyboards in many locations as best suits individual applications. Cursor control device can also be incorporated into other devices which require cursor control such as electronic mice.

18 Claims, 13 Drawing Sheets

SINGLE STATION CURSOR DEVICE SUITABLE FOR KEYBOARDS

FIELD OF THE INVENTION

This invention relates generally to cursor control devices. More particularly, this invention pertains to cursor control devices which utilize pressure sensitive resistors to provide cursor control. In particular, this invention utilizes a pressure sensitive resistor to generate a variable output signal or signals which correspond to variations in the direction, magnitude or combination of direction and magnitude of an applied input pressure. The cursor control of the present invention can be embodied in a single key or input device.

BACKGROUND OF THE INVENTION

A computer operator must frequently be able to position a cursor on a display device such as a cathode ray tube (CRT) or other visual display device. The operator must be able to position the cursor both horizontally and vertically over most of the surface of the display. Additionally, it is often desirable to make both horizontal and vertical movements simultaneously, or nearly simultaneously, such that the cursor moves diagonally or with a curvilinear motion, or at least appears to do so to an operator. It has also been widely recognized in the art that it is often desirable to minimize the size and complexity of the hardware and software needed to position the cursor, such as by using a single input device. This has particularly been the case with the development of software which relies heavily on a graphical user interface, due to the increased reliance on cursor positioning, and with the development of more compact computer designs such as portable and notebook size personal computers, due to the reduction of keyboard space available for cursor control.

One of the early approaches to cursor positioning was to provide some of the existing alphanumeric keys on a standard QWERTY keyboard, of the type commonly used in the industry, with extra functionality. This was done by using a separate control key such as "ALT" or "CTRL" in combination with an alphanumeric key to create control codes to designate up, down, left and right cursor movement. This approach has several significant limitations. It limits the use of the designated keys with respect to other software functionality which could be provided. Designs of this type also require the manipulation of several keys in combination, and thus reduce operator efficiency when used with software which requires frequent cursor movement.

A second approach to cursor positioning has utilized a plurality of dedicated cursor function keys. These keys have often been located on the right side of a standard QWERTY keyboard, adjacent to the alphanumeric keys. Typically, four keys were used to provide the vertical and horizontal movements noted above. This approach is also not very space efficient because it requires additional keys and hence, the use of larger keyboards, or more keyboard space, than would otherwise be required. This cursor positioning arrangement also typically requires an operator to move his hands away from the home key positions located in the center of the keyboard, thus reducing the efficiency of the operator.

A limitation of both dedicated cursor keys and cursor keys which are also alphanumeric keys, has to do with the speed of the cursor movement. Typically these keys can make discrete cursor movements corresponding to discrete keystrokes. Increasing the keystroke rate increases the rate of cursor movement. These keys also have an adjustable preset cursor speed for situations where a cursor key is held depressed continually. The limitation is that the preset speed is not variable during cursor operation, or if variable, varies based on the length of time during which the key is depressed. Therefore, an operator cannot effectively adjust the cursor speed during operation. Also, these cursor control arrangements are usually not capable of providing diagonal or curvilinear cursor movements.

A third approach to cursor positioning has been the use of separate graphic input devices, such as electronic or optical mice, trackballs, data tablets, or joysticks. These are often referred to as pointing devices, because they have the ability to move the cursor from one point on a display screen to another point by what appears to an operator as diagonal or curvilinear movement. These devices have the ability to make large movements on a display device, such as a cathode ray tube (CRT) screen, faster than such movement can be accomplished by with the use of dedicated cursor keys.

Pointing devices, however, have several generic limitations, particularly when used in conjunction with an alphanumeric input device such as a keyboard. One limitation is that these devices require additional space. Either more space must be dedicated on the keyboard, or additional work space, such as space adjacent to the keyboard must be used to house and operate the device. For example, a typical electronic mouse device requires space to house the electronic mouse, and space to move the electronic mouse in order to generate cursor movement on the display device. In some product applications, such as laptop or notebook size personal computers, it is very difficult because of their small size to dedicate additional space on the keyboard to a pointing device. Also, the portable nature of these products often make it difficult if not impossible to find workspace available to house and operate these devices. In addition, another limitation of this type of input device is that when they are used in conjunction with a keyboard, their operation usually requires that the operator remove at least one hand from the home keys. When used with software applications which require a combination of alphanumeric keystrokes and cursor movements, pointing devices can be cumbersome. Another limitation is that pointing devices are often considered to be undesirable for making small horizontal or vertical movements, such as moving up or down one line, or moving backward or forward one character. Therefore, it is often necessary to have dedicated cursor keys such as those described above, to be used in conjunction with pointing devices. This replication of functionality requires additional space and can be costly.

A fourth approach to cursor positioning, designed to avoid some of the limitations noted, has been to consolidate the normal cursor functionality, and in some cases pointing device functionality, into one key. One such approach is described in U.S. Pat. No. 4,680,577 to Straayer et al. In this approach, a multipurpose keyswitch for controlling cursor movement is described. The keyswitch has the ability to sense both lateral movement for cursor control and vertical movement for character entry. The approach requires the use of a key cap, a reference structure and sensors to detect key cap movement. The key cap moves laterally with respect to the reference structure. The sensors are used to detect lateral and vertical movement. These structures are relatively complicated mechanical structures due to the necessity of attaching sensors to the reference structure. Also, the physical size constraints of the hardware required to produce the functionality of this invention, particularly vertical key travel, make it undesirable for use in some applications which require low key profile, such as laptop and notebook size personal computer keyboards. In addition, this invention seems to require that an operator manually switch modes between alphanumeric input and cursor control input, such as by use of a control key as described previously. The present invention does not require attachment of sensors to a reference structure, because vertical key travel is not required for operation of the device. The present invention also does not require switching modes from cursor to alphanumeric inputs.

SUMMARY OF THE INVENTION

In accordance with the illustrated preferred embodiment, the present invention solves many of the limitations of related art cursor control devices set forth above by providing a single key or input cursor control device for controlling the movement of a cursor on a display, such as a CRT display. The single key or single input cursor control device of the present invention can sense the magnitude and direction of a variable input pressure and convert it to a variable resistance output or plurality of outputs, for controlling horizontal, vertical, diagonal and curvilinear cursor movement on a display device such as a CRT. The single key cursor control device can be used in the same manner as standard horizontal and vertical cursor keys, and also in the same manner as a pointing device which is capable of producing all types of cursor movement.

The device of the present invention includes an actuation means, pressure sensitive resistance means and a base support means. In a single key cursor control device, the invention includes a key cap, a pressure sensitive variable resistor and a base support structure. The key cap can be of standard design. It is capable of being actuated using a finger, such as an operator's index finger. The key cap is designed to transmit pressure to the pressure sensitive variable resistor. The pressure is primarily transmitted vertically. In some embodiments, it may be desirable to introduce to enhance the transmission of pressure by use of a coupling means such as an elastomeric element. The pressure sensitive variable resistor includes a conductive element and an electrically semiconductive, or variably resistive, element. These are combined into a layered structure and placed adjacent to and under the key cap to facilitate actuation.

The base support means is provided to assist in transmitting the pressure to the pressure sensitive variable resistor. This support means takes a number of forms, including a base or key housing plate for a keyboard.

The output of the pressure sensitive variable resistor produces an analog signal or signals which represent the magnitude and direction of the desired cursor movement. The analog signal is converted to a digital signal through the use of a frequency generator circuit to make the cursor control signal compatible with the discrete horizontal and vertical movement of the cursor on the display.

One embodiment of a single key cursor control device involves adding a single key cursor control onto a standard QWERTY keyboard in conjunction with four dedicated cursor keys and in the same region of the keyboard. In this case, the single key cursor control device provides a pointing device, but can be used for discrete cursor movements as well.

In a second embodiment of a single key cursor control device, this key is used to create a stand-alone device, such as an electronic mouse. In this instance, the single key cursor control replaces the usual combination of roller balls and encoders, or other motion detection arrangements, used to provide indications of the magnitude and direction of the electronic mouse movement which correspond to the desired cursor movement on the display device. The electronic mouse incorporating the single key cursor control device, while retaining the feel of a standard mouse device, does not, however, require movement of the electronic mouse. It only requires manipulation of the cursor key. Other functionality, such as switches used to make selections on the display device, can be retained.

One object of the present invention is to provide a single key cursor control device which combines the functionality of cursor control keys and pointing devices to provide horizontal, vertical, diagonal and curvilinear cursor movement.

A second object of the invention is to provide a cursor control device with a size and profile which permits it to be incorporated into even the most compact keyboards, such as those used on laptop and notebook personal computers.

A third object of the invention is to provide a cursor control device which does not require the use of additional control keys.

A fourth object of the invention is to provide a device which is capable of generating a variable resistance output in response to a variable input pressure.

Other objects associated with various embodiments of a single key cursor control device can be readily apprehended from the teachings of the present invention.

One advantage of the present invention with respect to the embodiments illustrated, is the relative cost. The single key cursor control device requires relatively few components, and low cost assembly methods can be utilized. Contrasting this with, for example, a standard electronic mouse pointing device, the single key cursor control does not require roller balls, X and Y encoding sensors and associated electronics.

A second advantage has to do with space efficiency. The single key cursor control device can be housed and operated in much less space than most other devices used for cursor control.

Thirdly, the single key cursor control device, as a pointing device, permits advantageous control of the cursor through the use of fine human muscle groups such as the index finger, rather than major muscle groups such as the combination of fingers, hand, wrist and arm required for devices such as electronic mice and joysticks, thereby allowing more precise control of the cursor. It also should reduce the repetitive keystrokes required to operate normal cursor control keys.

Fourthly, the single key cursor control device should provide an advantage with respect to reliability and maintainability. Pointing devices such as electronic mice often require cleaning because the accumulation of dirt in the roller ball housing effect performance. Standard cursor keys and single key cursors which utilize vertical travel, can be subject to problems such as sticking due to wear or contamination of the vertical travel mechanism. The single key cursor control device of the present invention has the advantage of not requiring cleaning or vertical travel, thereby avoiding the limitations noted.

The preceding briefly describes some of the objects, features and advantages of the present inventions. A more detailed understanding of the objects, features and advantages of this invention may be obtained by examination of the following drawings, detailed description of the invention and claims.

BRIEF DESCRIPTION OF THE DRAWINGS

FIG. 4 is a section view of an assembled single key cursor control device.

FIG. 13 is a schematic diagram of control circuitry used to operate the cursor control device of this invention.

DETAILED DESCRIPTION OF THE PREFERRED EMBODIMENTS

Figure 1:
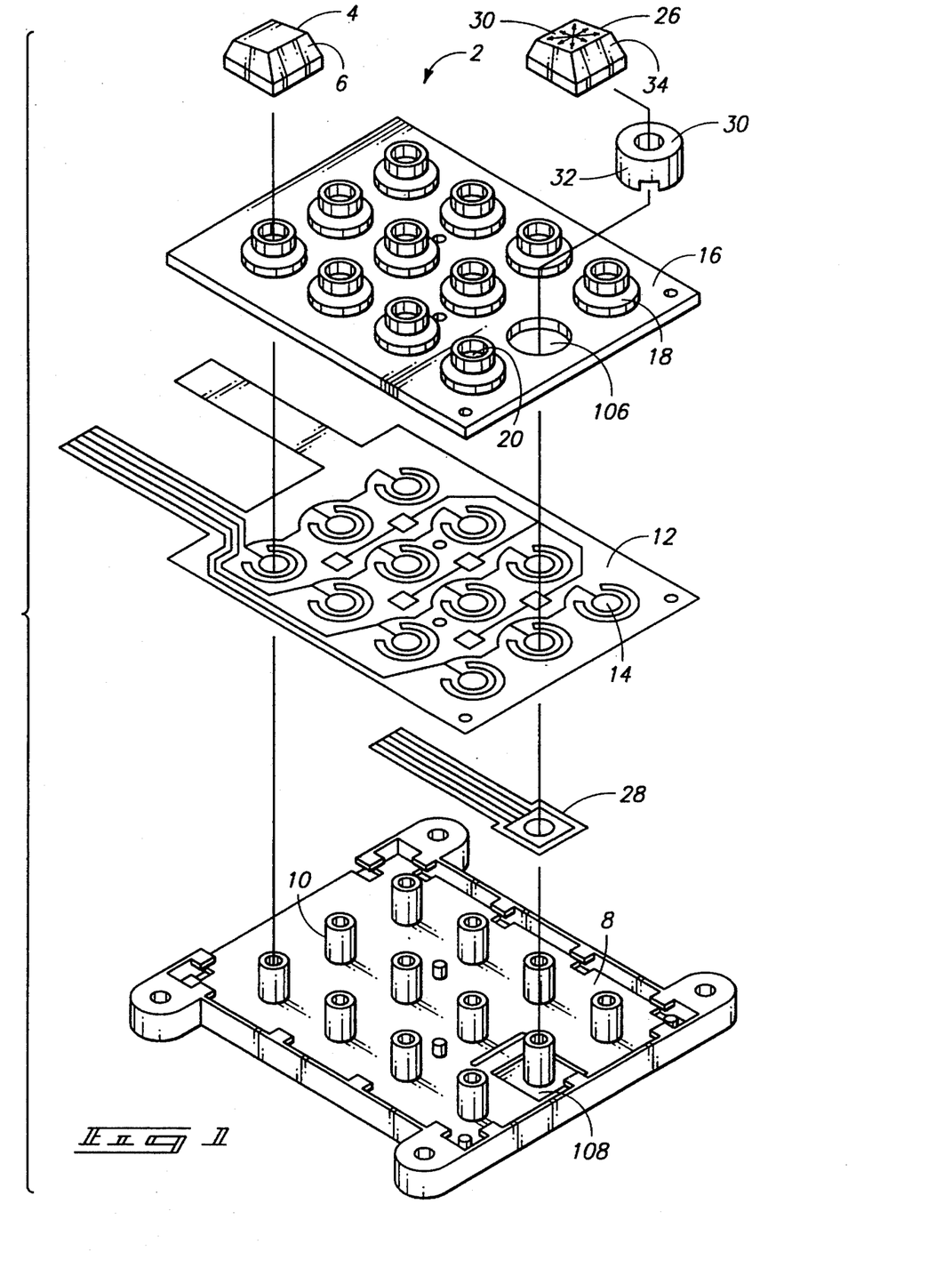
FIG. 1 is an exploded view of a keyboard of typical construction which incorporates a single key cursor control device.
Figure 2:
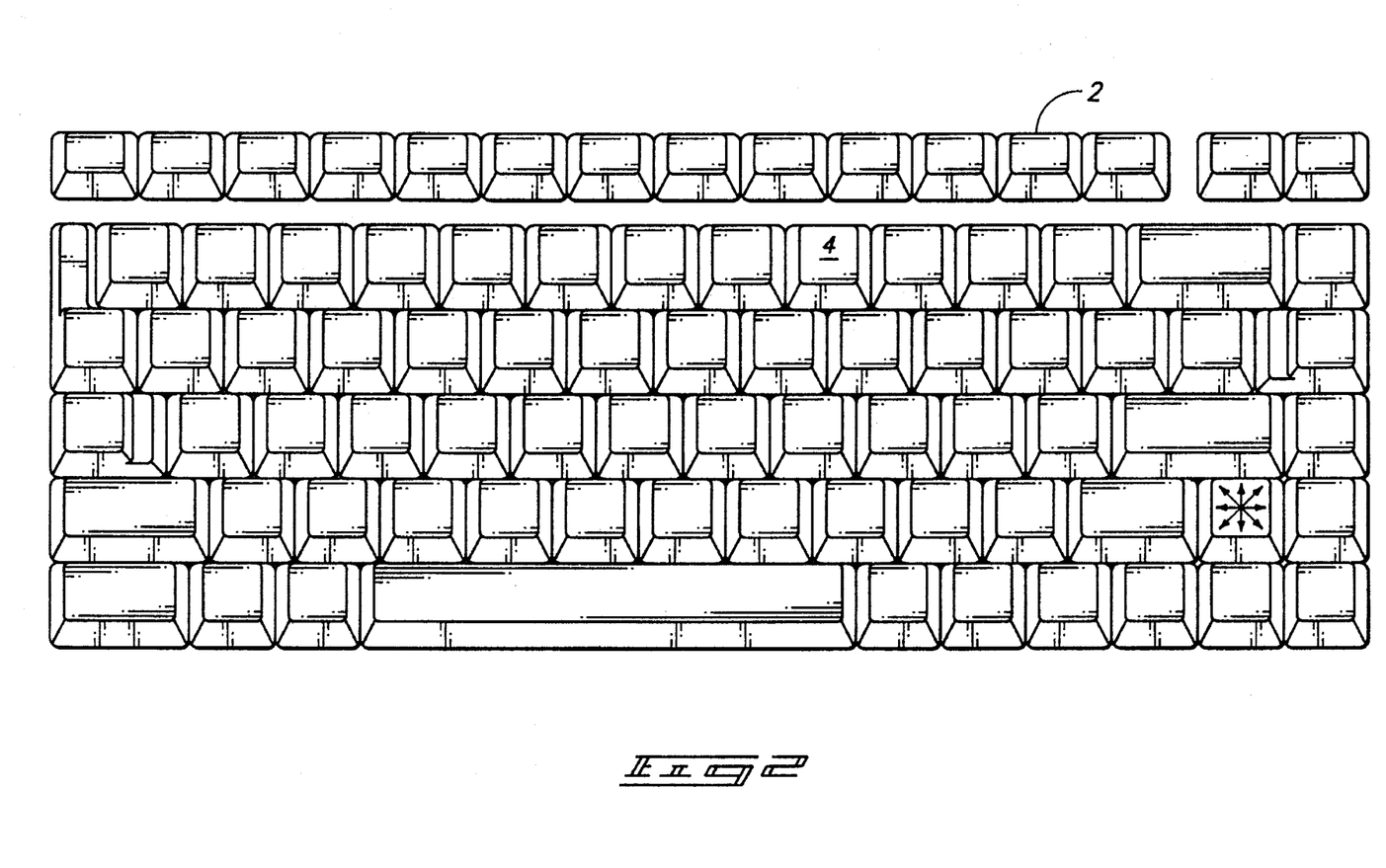
FIG. 2 is a top view of a keyboard having an arrangement of keys suitable for compact applications, which illustrates how a single key cursor control device could be incorporated.
Figure 3:
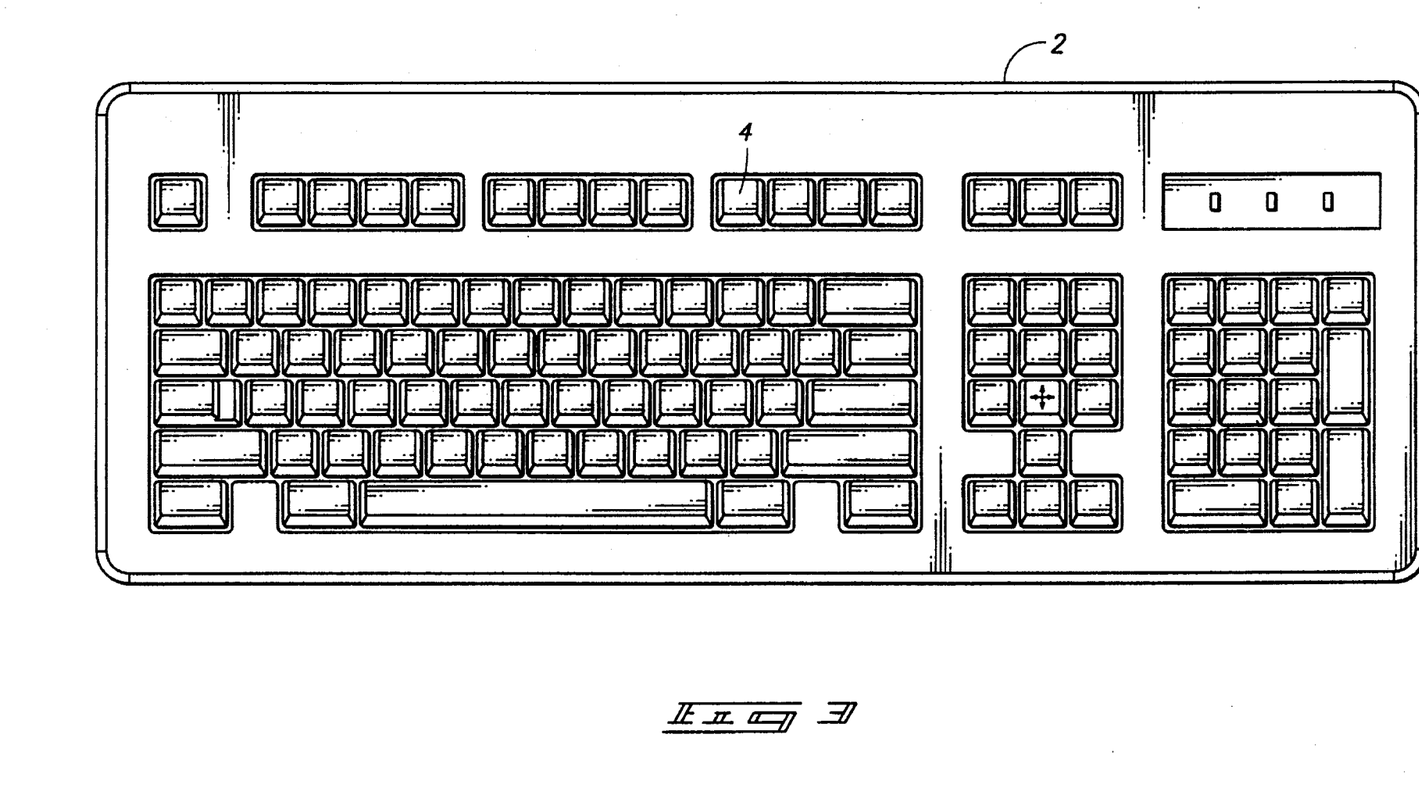
FIG. 3 is a top view of a keyboard having an arrangement of keys suitable for full-size applications, which illustrates how a single key cursor control device could be incorporated.

Referring now to FIGS. 1, 2 and 3, a preferred embodiment of the cursor control device as a single key cursor incorporated into a standard QWERTY keyboard is illustrated. FIG. 1 is an exploded perspective view of a keyboard 2 of a type offered for sale commercially. Keyboards utilizing other construction methods can also utilize the cursor control of the present invention. Keyboard 2 of FIG. 1 illustrates only a twelve key arrangement for simplicity of illustration, but the same construction can be utilized for a full QWERTY keyboard as illustrated in FIGS. 2 and 3.

Referring now to FIG. 1, Keyboard 2 includes a plurality of keys 4 having key caps 6 engaged upon the internal construction shown. Keyboard 2 comprises a support base 8, which in this embodiment is a key housing sheet for housing the various elements of keyboard 2. Support base 8 has a plurality of hollow cylindrical projections 10 extending upwardly. These extensions house keys 4 and also orient keys 4 with respect to one another. Flexible circuit 12, having a plurality of circular openings 14, is engaged upon support base 8 with circular openings 14 concentric upon cylindrical projections 10. A flexible boot sheet 16, having a plurality of generally cylindrical extensions 18 with circular openings 20 in their top surfaces, is engaged upon cylindrical projections 10 of support base 8 over flexible circuit 12, with cylindrical extensions 18 and circular openings 20 concentric upon cylindrical projections 10. Key caps 6 have flexible retention arms 22 extending downwardly from their bottoms as illustrated in FIG. 4. Flexible retention arms 22 are designed to engage slots 24 in cylindrical projections 10 illustrated in FIGS. 1 and 4. Key caps 6 are inserted through circular openings 20 in flexible boot sheet 16 and circular openings 14 in flexible circuit 12, into cylindrical projections 10. Flexible retention arms 22 engage slots 24, thereby retaining key caps 6 upon support base 8. The assembly provides a plurality of keys 4. As mentioned, single key cursor 26 is not limited to application with the keyboard construction illustrated in FIG. 1. FIG. 1 is directed to a capacitance type keyboard 2, but single key cursor control 26 could also be incorporated into a contact type keyboard 2.

Referring again to FIG. 1, keyboard 2 also contains single key cursor control 26 of the present invention. The location of single key cursor control 26 is illustrative only, and not indicative of a desired or required placement location. FIG. 2 illustrates a first embodiment of the location of single key cursor control 26 on a representative QWERTY type keyboard 2. Single key cursor control 26 on keyboard 2 may be located differently in various embodiments to take into consideration various key 4 configurations utilized, such as 84, 101, 102 and 108 key models, location can also be varied to take into consideration a wide variety of factors comprising operator preference, enhanced operator performance and various hardware and software applications for which keyboard 2 may be used.

Referring now to FIGS. 1 and 4, the elements and construction of single key cursor control 26 are described. Single key cursor control 26 includes a pressure sensitive resistor 28 and a means for actuating 30 the pressure sensitive resistor 28. In the embodiment illustrated in FIGS. 1 and 4, the means for actuating 30 includes an actuator 32 and key cap 34.

Figure 5:
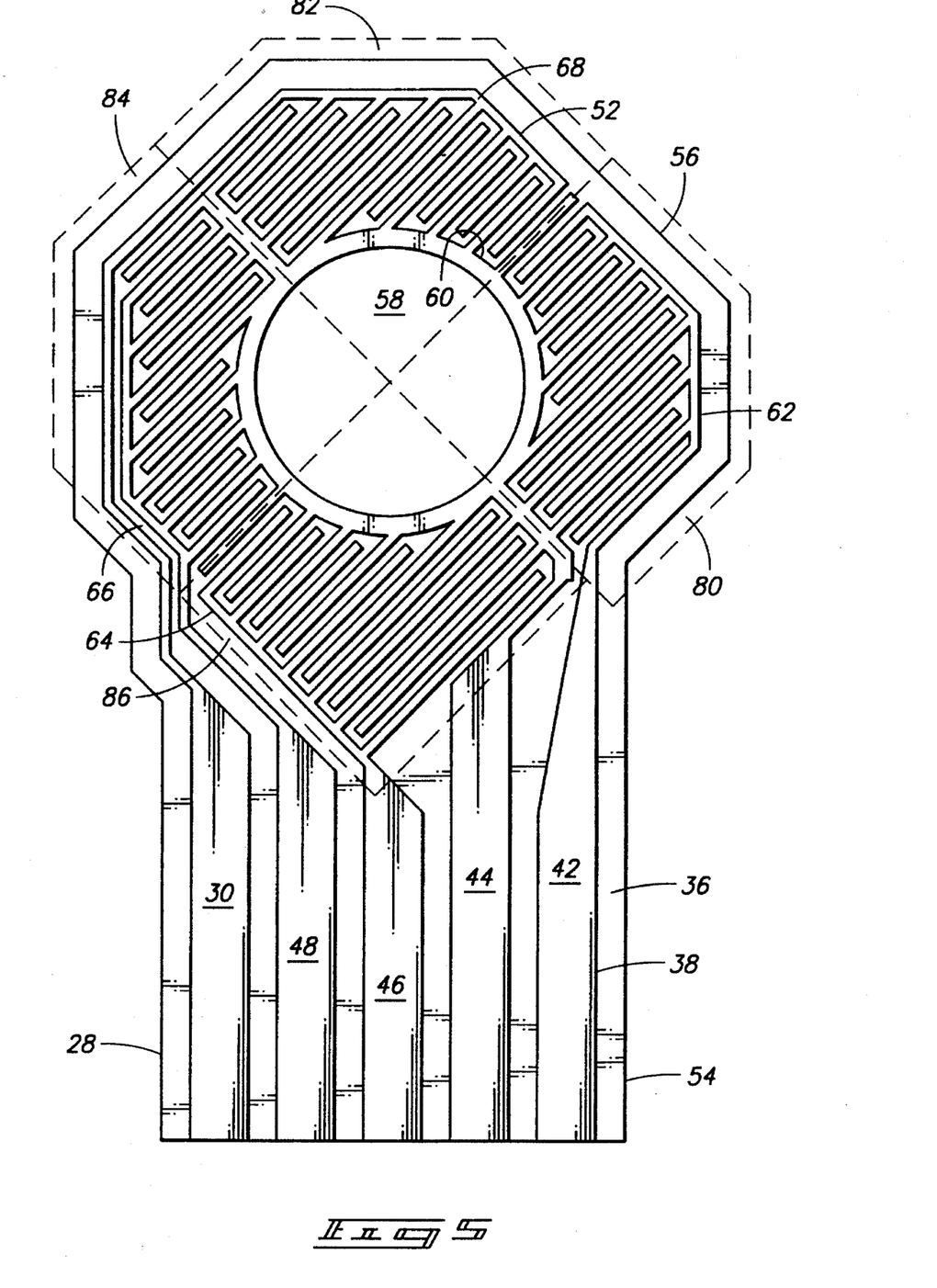
FIG. 5 is a top view of pressure sensitive resistor showing only the conductor layer.
Figures 6, 7:
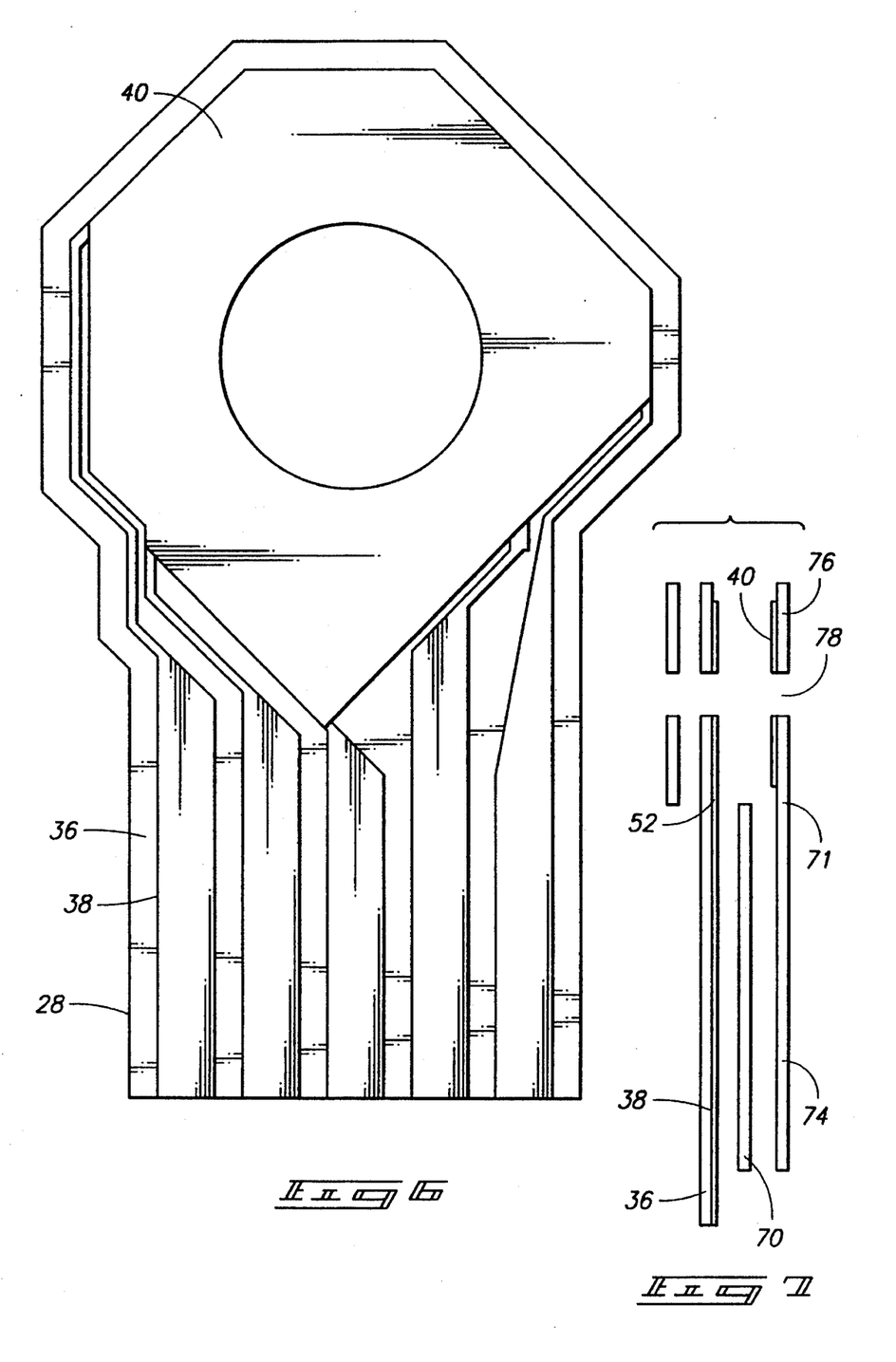
FIG. 6 is a top view of a pressure sensitive resistor showing all layers.
FIG. 7 is an exploded cross-section view of the device of FIG. 6.

The pressure sensitive resistor 28 is illustrated more completely in FIGS. 5–7. One embodiment of pressure sensitive resistor 28 is a structure which comprises a support member 36, a conductor 38, and a pressure sensitive resistive material 40. Pressure sensitive resistive material 40 has the characteristic of varying in resistance in response to changes in an applied pressure. Pressure sensitive resistive material 40 is also sometimes referred to conversely as a semiconductive material. Examples and additional description of several combinations of support member 36, conductor 38 and pressure sensitive resistive material 40 are given in U.S. Pat. No. 4,315,238 to Eventoff, which is hereby incorporated by reference.

Referring again to FIG. 5, this drawing illustrates a conductor 38 comprising leads 42, 44, 46, 48 and 50 and an interdigitated pattern 52 deposited on support member 36. In this embodiment, support member has a lead end 54, a sensor end 56 and an opening 58. Interdigitated pattern 52 is deposited onto sensor end 56 and comprises a common conductor element 60, which transitions into lead 44, and a plurality of source conductor elements 62, 64, 66 and 68 which transition into leads 42, 46, 48 and 50 respectively.

FIGS. 6 and 7 illustrate a complete pressure sensitive resistor 28. Pressure sensitive resistive material 40 is deposited on a second support member 72 having lead end 74, a sensor end 76 and an opening 78. Pressure sensitive resistive material 40 is deposited on sensor end 76 of second support member 72. Second support member 72 is placed over support member 36 containing conductor 38, with pressure sensitive resistor material 40 facing and in contact with interdigitated pattern 52. The interdigitation of source conductor elements 62, 64, 66 and 68 with common conductor element 60, in contact with pressure sensitive resistor material 40 forms four distinct variable resistors 80, 82, 84 and 86, the workings of which are described hereinbelow. In the embodiment illustrated, support member 36 and second support member 72 are laminated together with an adhesive spacer 70. Other embodiments may not require that these elements be adhered together. Simply being placed in the contacting relationship disclosed as separate elements may be sufficient for some embodiments.

Figure 8:
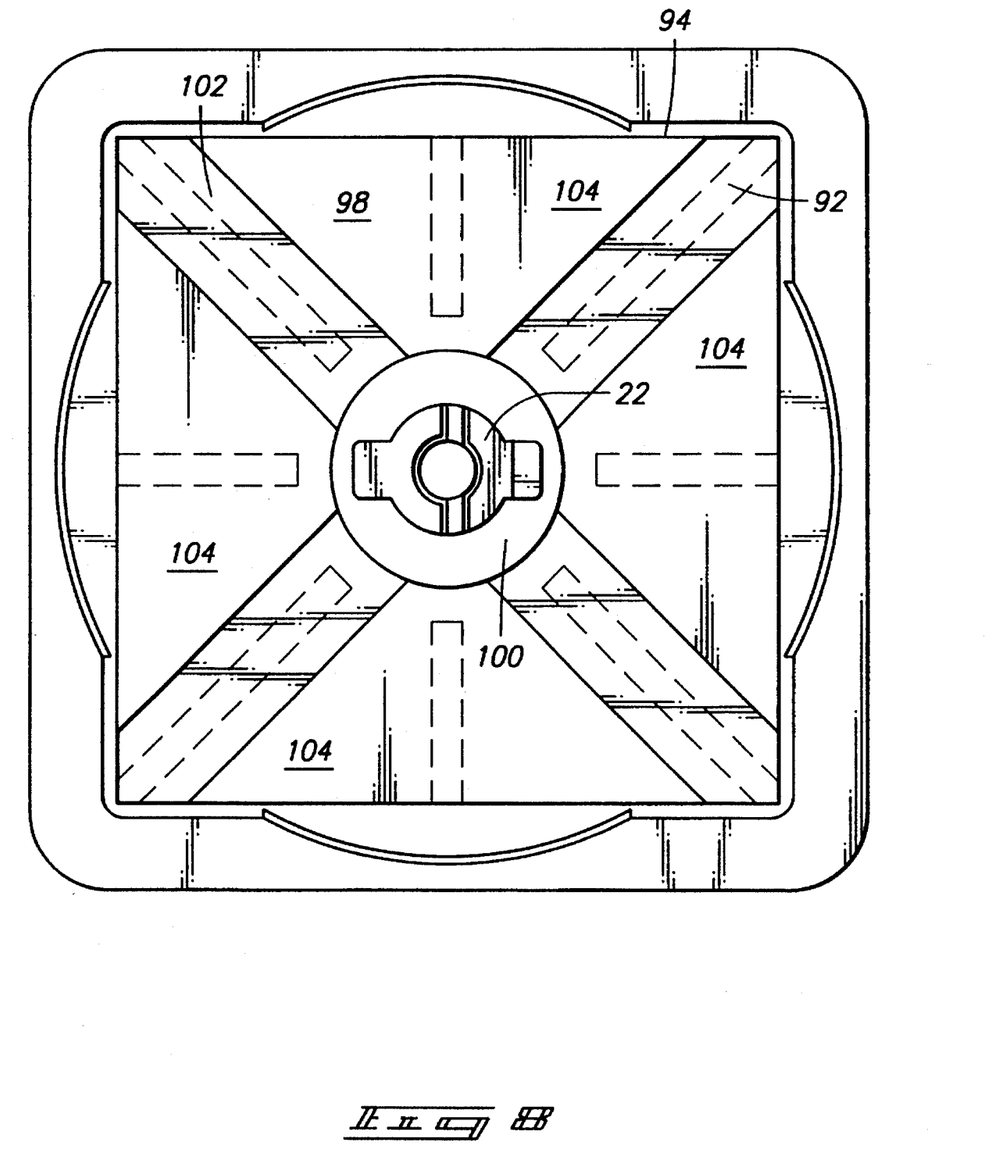
FIG. 8 is a view of the single key cursor control device taken along line 8—8 of FIG. 4.
Figure 9A:
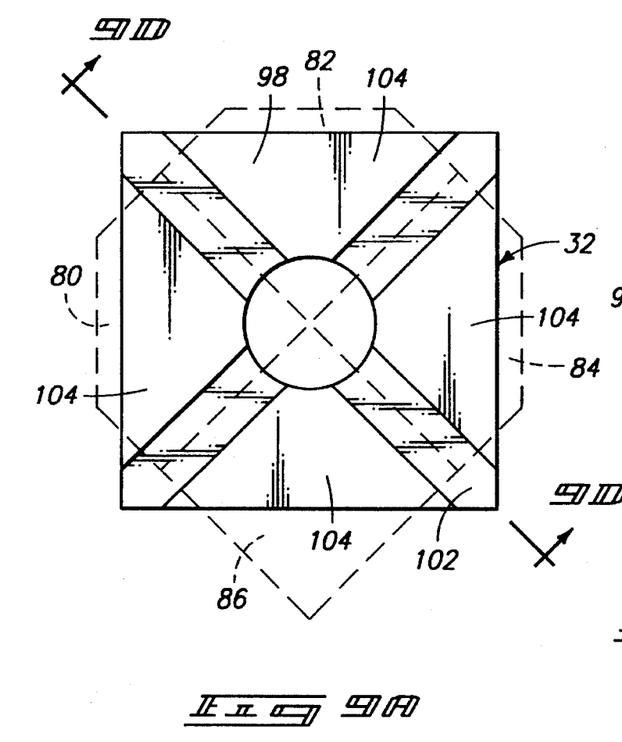
FIG. 9 shows a bottom view, a top view, a front view, and a side view of an actuator employed in the single key cursor control device of this invention.
Figure 9B:
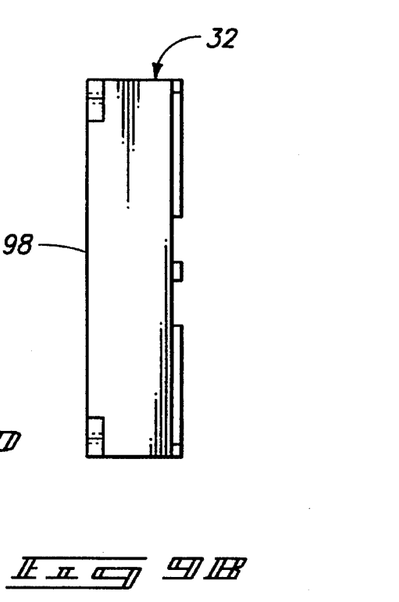
Figure 9C:
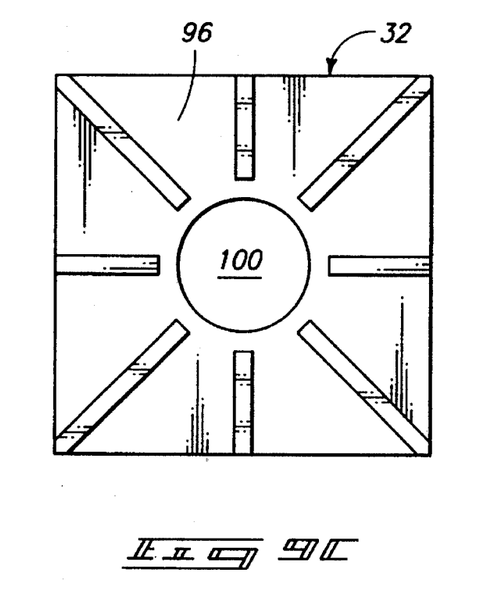
Figure 9D:
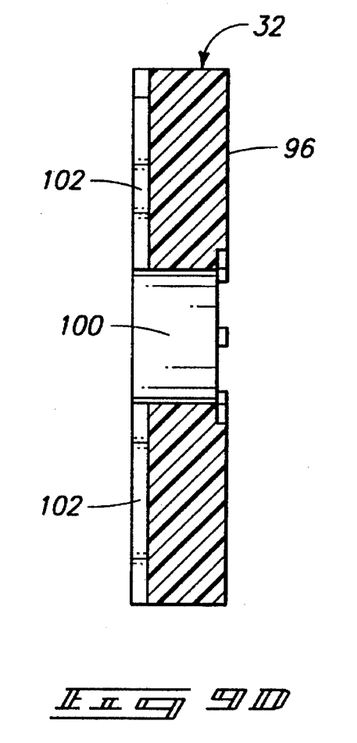

Referring now to FIGS. 4, 8 and 9, the means for actuating 30 the pressure sensitive resistor 28 is described in more detail. As shown in FIG. 4, key cap 34 comprises a hollow, four-sided, truncated dome-shaped structure of a type well known in the art. The top surface 88 of key cap 34 is adapted to conform to the shape of a human finger, so that a finger can be utilized to apply varying amounts of pressure over the surface of key cap 34 corresponding to desired directions and speed of cursor travel on a display device, as described further below. The bottom surface 90 of key cap 34 has flexible retention arms 22, ribs 92 and opening 94. Flexible retention arms 22 are used to retain single key cursor control 26 to support base 8 in the manner described previously. Ribs 84 are provided to assist in transmitting pressure applied to top surface 88 to actuator 32.

As shown in FIG. 9, actuator 32 has top surface 96, bottom surface 98 and an opening 100. Top surface 96 is rectangular and sized such that it can be inserted into and engage opening 94 in key cap 34. Opening 100 is sized to accommodate cylindrical projection 10 and flexible retention arms 22. Bottom surface 98 is generally rectangular in shape with grooves 102 on the diagonals of the rectangle which separate bottom surface 98 into four generally triangular actuation surfaces 104. Bottom surface 98 and grooves 102, and hence actuation surfaces 104, are sized to engage variable resistors 80, 82, 84 and 86. It is desirable that actuation surfaces 104 cover as much of the interdigitated portion of variable resistors 80, 82, 84 and 86 as possible to enhance the sensitivity of these resistors in response to changes in applied pressure, as further described below. In a preferred embodiment, actuator 32 is made from a resilient material such as silicone rubber. Also in a preferred embodiment, grooves 102 comprise a half-cylinder with a radius on the order of 0.050 inches.

In this embodiment, the only modification of keyboard 2 required is that the boot sheet 16 have an opening 106, such as the rectangular opening shown, sufficient to allow actuator 32 to contact pressure sensitive resistors 80, 82, 84 and 86. A cavity 108 can also be provided to help orient pressure sensitive resistor 28 on support base.

Figure 10:
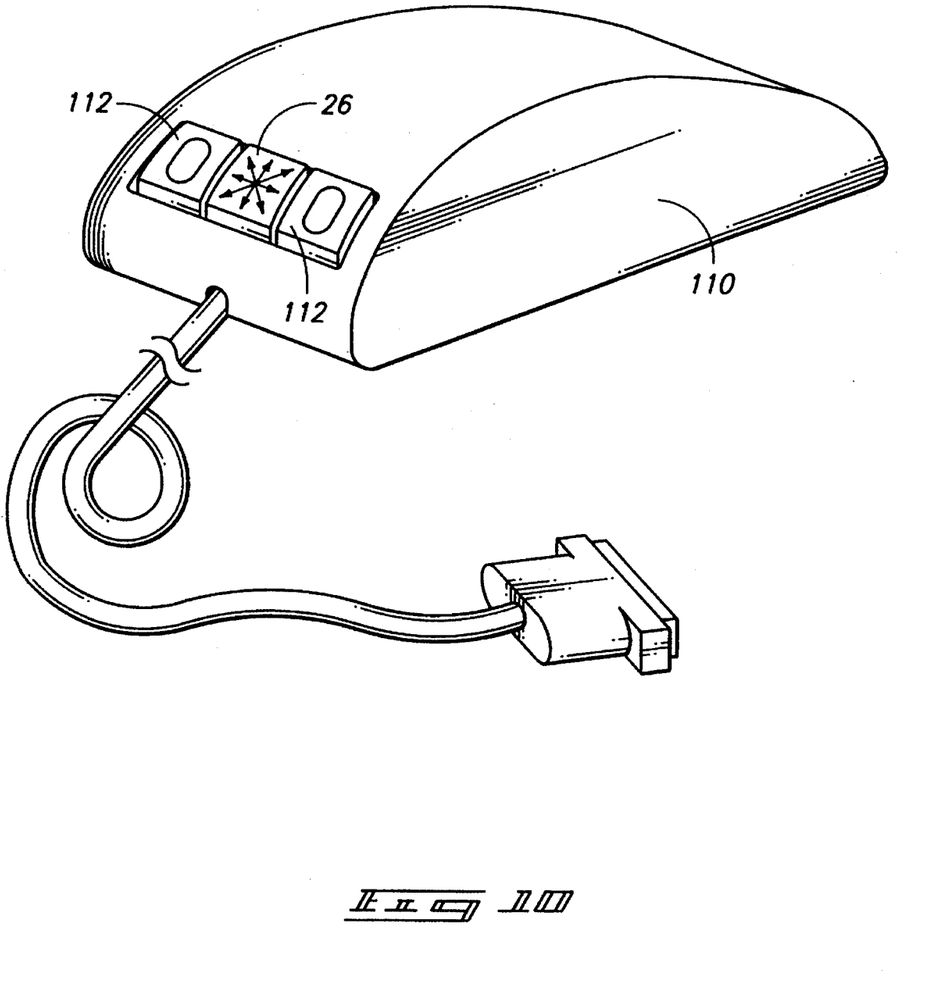
FIG. 10 illustrates a pointing device incorporating the single key cursor control device according to a second embodiment of this invention.

A second embodiment of the present invention is illustrated in FIG. 10. A single key cursor control device 26 of the present invention is incorporated into a mouse type pointing device 110. In this instance, rather than, for example, a device which requires a roller ball or balls and associated encoders and decoders to translate linear motion into cursor movement, the single key cursor control offers a major advantage in that it allows movement of a cursor on a display device without requiring actual movement of the mouse. Select switches 112 of the type typically provided with mouse devices can also be provided to replicate the functionality of the present mouse devices. The device of the present invention could also be incorporated into other embodiments for similar pointing devices such as trackballs and joysticks.

Figure 11:
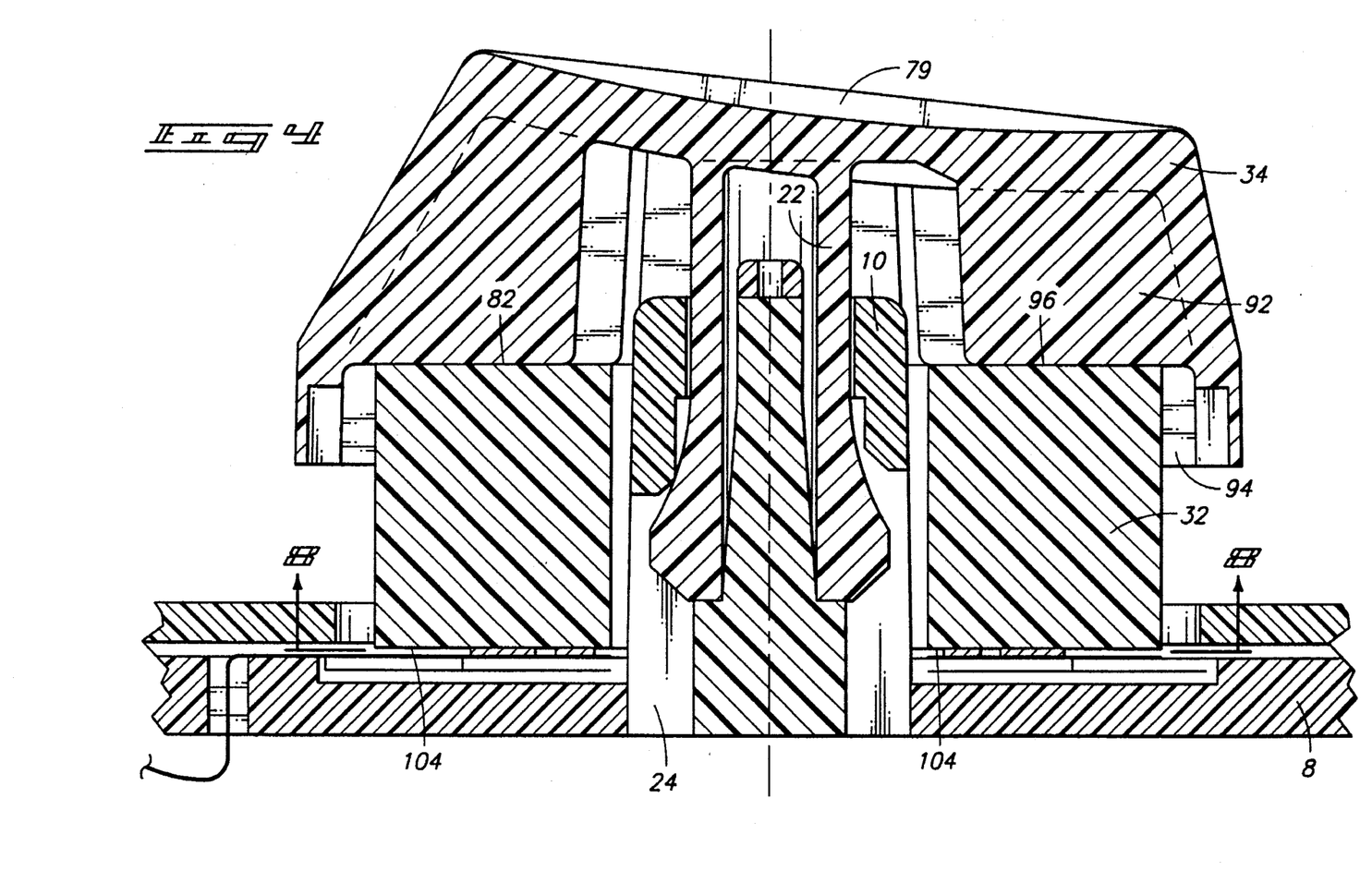
FIG. 11 illustrates the single key cursor control device located on a keyboard adjacent to a spacebar according to a third embodiment of this invention.
Figure 11B:
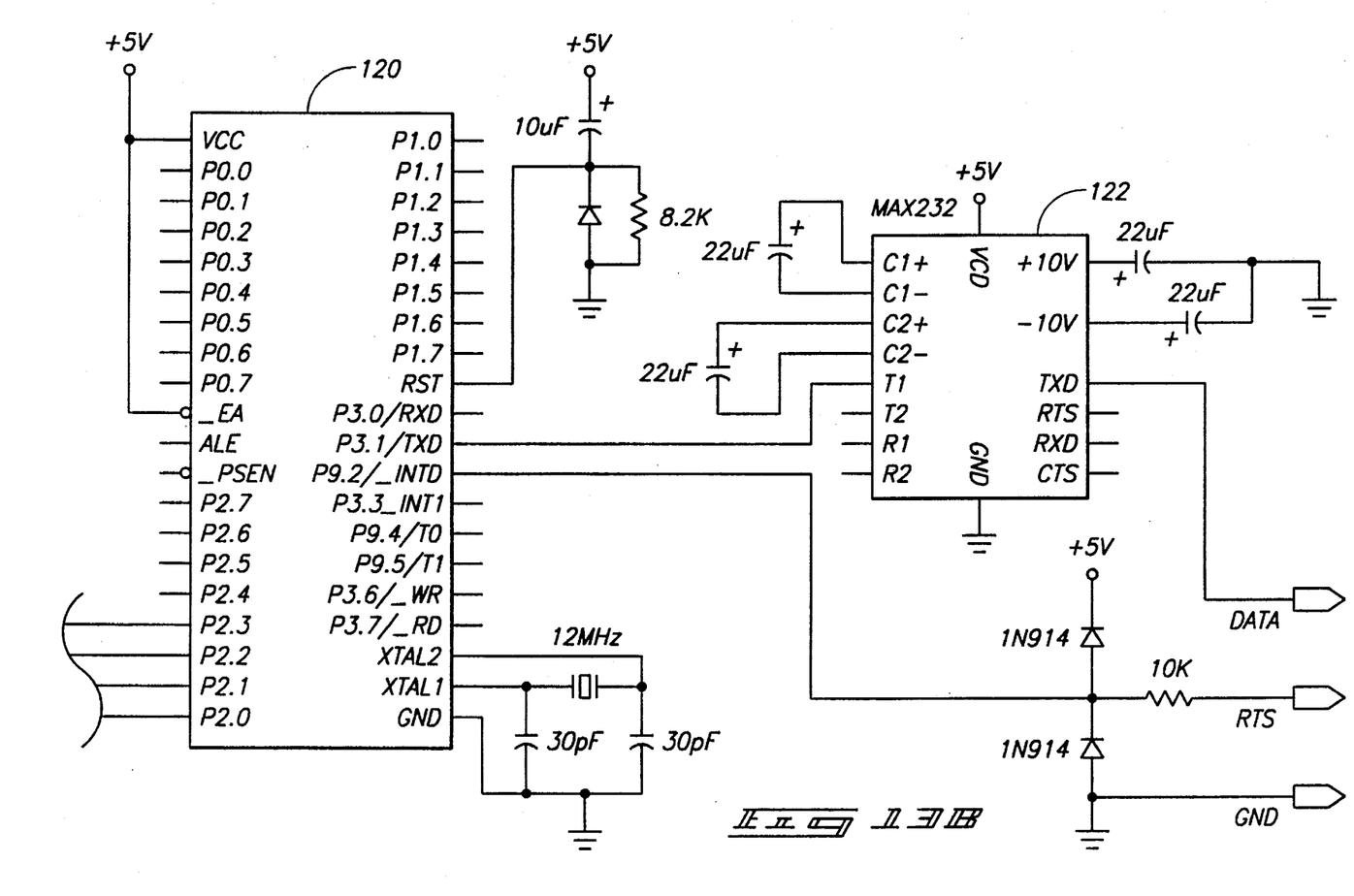

In a third embodiment, a single key cursor control 26 of the present invention can be located on a keyboard 2 of typical construction adjacent to the spacebar 114, as illustrated in FIG. 11, so as to be actuated by an operator with the use of his thumb. This arrangement is believed to offer a particular advantage because it permits operation of the cursor without moving the operators fingers significantly from the home key positions. This should result in an efficiency advantage because it should remove the delay associated with moving the fingers to a cursor control or pointing device. This device could also incorporate select keys 112 such as those used in the art with other pointing devices to allow replication of pointing device functionality without requiring an operator to remove his hands from the home keys.

Figure 12A:
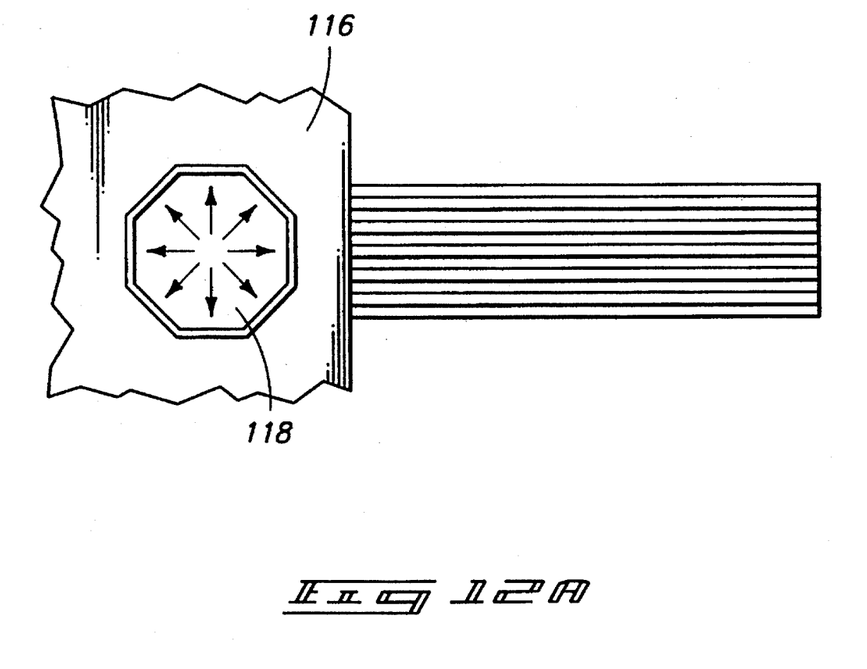
FIG. 12a shows a top view of a cursor control according to a fourth embodiment of this invention.
Figure 12B:
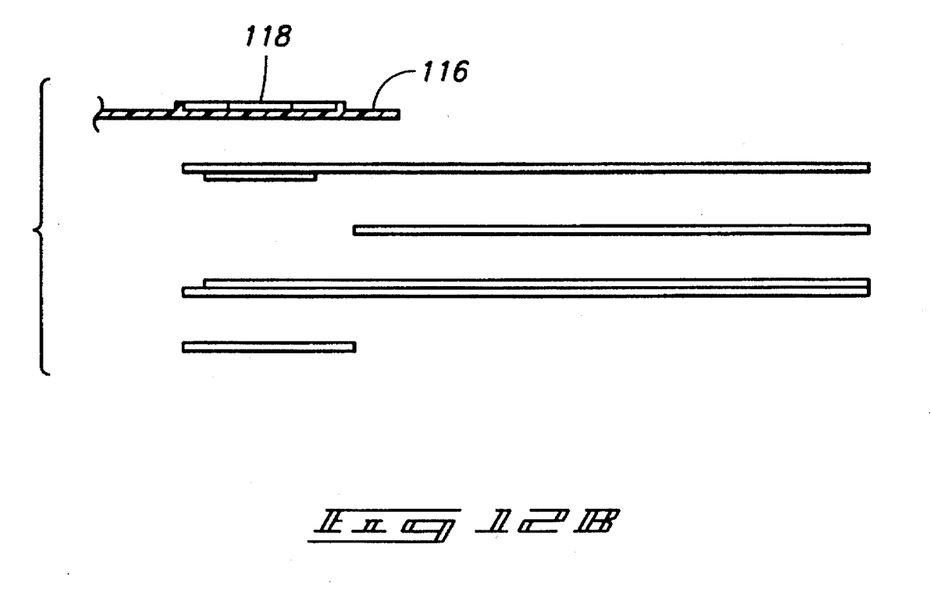
FIG. 12b shows an exploded side view of the FIG. 12a cursor control.

A fourth embodiment of the cursor control of the present invention is shown in FIGS. 12a and 12b. In this embodiment of the invention, a pressure sensitive resistor 28 of the type described herein could be utilized. Means for actuation could comprise a touch panel 116 such as a flexible touch panel. Touch panel materials could be materials commonly used for touch panel covers over switches on devices such as microwave ovens and certain types of calculators. Touch panel 116 may provide a contiguous sheet extending beyond the borders of pressure sensitive resistor so as to protect the pressure sensitive resistor 28 from a harsh external environment. A legend 118 may be used to designate the areas under which the pressure sensitive resistor 28 is located and to designate cursor directions. This embodiment would offer the advantage of providing a single input cursor control device which can be sealed from harsh environments.

Referring now to FIG. 4, the function and operation of the single key cursor control device 26 is described. The various embodiments described above would function similarly. When assembled in the manner shown in FIG. 4, actuator 32 is captivated between key cap 34 and flexible circuit 12, and actuator 32 is under slight compression thereby urging key cap 34 away from support base 8. When a pressure is applied such as by pressing a finger against top surface 80, pressure is transmitted to actuator 32 by ribs 92 pressing against the top surface 96 of actuator 32. The pressure is transmitted vertically through actuator 32, and results in a pressure being transmitted vertically through actuation surfaces 104 and onto one or more of variable pressure sensitive resistors 80, 82, 84 and 86. The isolation provided by grooves 102 reduces the tendency for a pressure which is intended to be applied principally to one of resistors 80, 82, 84 and 86 from being applied to a resistor associated with another cursor direction. On the other hand, the fact that actuator is a unitary whole in the regions adjacent to its top surface 96 allows for a necessary amount of mechanical coupling and resultant transmission of pressure between actuator surfaces 104 and hence, between resistors 80, 82, 84 and 86.

As pressure is applied via an actuator surface, to one of pressure sensitive resistors, the applied pressure causes the resistivity of pressure sensitive resistive material 40 to decrease. The result is a decrease in resistance of one or more of resistors 80, 82, 84 and 86. The resultant change in resistance creates a detectable output signal or signals which can be transmitted via the leads 42, 46, 48 and 50, to supporting electronics. Variable pressure sensitive resistors 80, 82, 84 and 86 are arranged to correspond to the directions up, down, left and right. Therefore, pressing key cap 34 directly over any one of these resistors will produce a change in resistance only in that resistor, and will result in a detectable output signal which indicates desired cursor movement in only one direction, either up, down, left and right. If key cap 34 is pressed in a location other than directly over variable pressure sensitive resistors, pressure will be applied to more than one of these resistors. The resulting output signals indicate that cursor movement is desired in a diagonal direction. As an example, to move the cursor diagonally, a force applied to the outer top surface of the keytop which applies an equal pressure to two identical adjacent variable pressure sensitive resistors will produce equal output signals on each and result indicate desired cursor movement at a 45 degree angle between the directions represented by these resistors. As more pressure is applied to one resistor than the other, the output signal of one resistor will become greater than the other, and the diagonal movement of the cursor will shift toward the direction represented by the resistor to which the greatest pressure is applied. Various algorithms known in the art can be can be utilized to determine what the resulting diagonal motion should be by comparing the values of the resulting output signals. For example, the software routine disclosed as Exhibit 1 can be used for this purpose.

FIG. 13 illustrates the supporting electronics. Output signals from variable pressure sensitive resistors 80, 82, 84 and 86 are interrogated through the process as follows. When pressure is applied to the outer top surface of key cap 34 a change in resistance or resistances is developed, which is sent into corresponding variable frequency generators 118. The output of frequency generators 118 is then sent to software frequency counter 120. The general workings of software frequency counter 120 are explained in the following paragraphs.

Software frequency counter 120 processes the data and transmits it to a conversion device such as the MAX232 chip 122, or a converter such as an analog to digital converter. The MAX232 chip 122 is used to convert the 5 volt output from microprocessor 120 to signals which can be used to control cursor movement, such as 12 volt RS232 compatible signals.

Referring now to FIG. 13 and Appendix 1, the following explains how the software for cursor key control operates. The first five pages of the software listing are not discussed in detail, because they cover the standard keyboard key scan process and the initialization routine. The software representing the single key cursor control key scan starts on page 6 at the label "CURSAN:". The first few lines are the initialization of the cursor key registers. At the label "COUNT:", the port that is attached to variable frequency generator 118 is read and compared to what was previously read from this port. If the data changes on the port then the program goes to page 8 label "datatm:". The direction is then checked and a preload eliminator count is checked for zero. If the preload count is zero, then the frequency is too low to be counted. If the preload count is not zero, then the counter for correct direction is increased by one. A count of one in the direction counter correlates to one cursor movement on the screen. This is how the speed of the cursor can be varied by change of the pressure applied to the key cap 34, as the frequency changes so do the number of cursor movements output to the display.

The preload eliminator employs one of the timer interrupts of the microprocessor 120 to measure the frequency from the variable frequency generator 118. The preload timer interrupt is located on page 11 label "PRLOAD:". The timer uses one register for each direction, and these four registers are initialized to a value of twenty, which is reinitialized each time a cursor movement is found. Each time the interrupt occurs the registers are decreased by a count of one until they are at zero. Thus, the preload timer measures the time between pulses on the port, so that if the pulses are too far apart (or not enough force is applied to key cap) the cursor will not move.

We claim:

1. A device comprising:

a member responsive to pressure applied by a user;

a pressure sensitive variable resistor comprised of opposed conductors having a junction resistance which varies inversely with pressure applied thereto, the pressure sensitive variable resistor comprising multiple isolated resistor regions; and an actuator having a bottom surface operably engagable against the opposed conductors in response to pressure applied to the member, the actuator bottom surface having grooves formed therein which define multiple actuation surfaces for engaging corresponding resistor regions.

2. The single key cursor control of claim 1 wherein the actuator is formed of an elastomeric compound.

3. The device of claim 1 wherein the actuator is formed of silicon rubber.

4. A computer keyboard having the device of claim 1 incorporated therein.

5. A computer input device having the device of claim 1 incorporated therein.

6. A single key cursor control for a computer keyboard comprising:

a base;

a key cap sized for engagement by a user's finger, the key cap being operably mounted to the base;

a pressure sensitive variable resistor comprised of opposed conductors having a junction resistance which varies inversely with pressure applied thereto, the pressure sensitive variable resistor having multiple isolated resistor regions arranged beneath the key cap; and an actuator positioned between the key cap and the pressure sensitive variable resistor, the actuator having a bottom surface operably engagable against the opposed conductors in response to pressure applied to the key cap by the user, the actuator bottom surface being separated into multiple actuation surfaces for engaging corresponding resistor regions.

7. The single key cursor control of claim 6 wherein the actuation surfaces of the actuator are separated by grooves.

8. The single key cursor control of claim 6 wherein the actuator is formed of an elastomeric compound.

9. The single key cursor control of claim 6 wherein the actuator is formed of silicon rubber.

10. A computer keyboard having the single key cursor control of claim 6 incorporated therein.

11. A computer input device having the single key cursor control of claim 6 incorporated therein.

12. A single key cursor control for a computer keyboard comprising:

a base having a projection extending upward therefrom;

a key cap sized for engagement by a user's finger, the key cap being mounted to the projection of the base;

a pressure sensitive variable resistor comprised of opposed conductors having a junction resistance which varies inversely with pressure applied thereto, the pressure sensitive variable resistor having an aperture formed therein through which the projection extends, the pressure sensitive variable resistor further comprising multiple isolated resistor regions spaced about the projection; and an actuator positioned between the key cap and the pressure sensitive variable resistor and about the base projection, the actuator having a bottom surface operably engagable against the opposed conductors in response to pressure applied to the key cap by the user, the actuator bottom surface being separated into multiple actuation surfaces for engaging corresponding resistor regions.

13. The single key cursor control of claim 12 wherein the actuation surfaces of the actuator are separated by grooves.

14. The single key cursor control of claim 12 wherein the actuator is formed of an elastomeric compound.

15. The single key cursor control of claim 12 wherein the actuator is formed of silicon rubber.

16. The single key cursor control of claim 12 wherein the actuator is annular with a central aperture sized to fit around the base projection.

17. A computer keyboard having the single key cursor control of claim 12 incorporated therein.

18. A computer input device having the single key cursor control of claim 12 incorporated therein.

* * * * *